Patented July 23, 1940

2,208,764

UNITED STATES PATENT OFFICE 2,208,764

EMBALMING COMPOSITION

Hilton Ira Jones, Wilmette, Ill., assignor to National Selected Morticians, Chicago, Ill., a corporation of the District of Columbia No Drawing. Application February 9, 1939, Serial No. 255,451

6 Claims. (Cl. 27—21)

The present invention is directed to the embalming art. More particularly, the present invention is directed to an improved composition for use in the preservation of dead bodies, e. g., a corpse.

The principal object of the present invention is to provide improved embalming compositions containing as an essential ingredient small amounts of a soluble salt of hydrofluosilicic acid. Another object of the present invention is to provide an improved embalming fluid containing magnesium silicofluoride.

Other objects of the present invention will be apparent as the description hereinafter proceeds.

The present invention is predicated on the discovery that soluble silicofluorides combine with protein tissues of dead bodies and form complex insoluble compounds which are incapable of being destroyed by the germs of decomposition. The present invention is also predicated on the discovery that soluble silicofluorides rapidly take up moisture (i. e., free water) from the tissues. Research investigations have shown, for example, that organs embalmed with a fluid containing a soluble silicofluoride (e. g., a pork kidney) to be substantially free of free or uncombined water a few hours after the embalming operation. This property (i. e., chemical or physical retention of the water) found in the silicofluoride embalming fluids prevents or retards to a great extent the deleterious dehydration of the tissues.

The following example of a preferred embalming fluid will serve to illustrate the present invention:

Example

| | Parts |
|---|---|
| Water | 138 |
| Formalin (40 percent HCHO) | 225 |
| Methanol | 47 |
| Glycerine | 16 |
| Magnesium silicofluoride | 23 |
| Magnesium sulphate | 3 |
| Nitrated sodium lauryl sulphonate | 15 |
| Color and perfume | As desired |

The above ingredients are mixed, thoroughly agitated and the stable solution obtained after filtering is employed in the usual manner in the process of embalming. The nitrated sodium lauryl sulphonate (used to lower the surface tension and obtain an increased penetration) may be purchased on the market under the trade name "Namo S." Other chemical agents capable of reducing the surface tension may be used, although the sulphonated higher aliphatic alcohols have been found particularly adaptable for use with magnesium silicofluoride.

The formaldehyde type embalming fluids have also been found particularly adaptable for use with the silicofluorides. The ingredients cooperate in maintaining the bodies in a perfect state of preservation.

The ingredients employed in the above example (including formaldehyde, methanol, glycerine, magnesium sulphate, surface tension reducing agent, color and perfume which are optional) may be used in varying percentages. Ordinarily it is preferred to employ small amounts of silicofluoride (e. g., 1 to 10 percent) although larger amounts (e. g., 15 to 25 percent) may be used, if desired.

Any soluble salt of hydrofluosilicic acid is suitable for use in accordance with the present invention. The water soluble alkali metal, alkaline earth, sodium-aluminum, copper and magnesium salts are illustrative examples. Investigations indicate the magnesium silicofluoride (and preferably the hydrated salt which is more soluble than the anhydrous salt) to be particularly adaptable for use in embalming fluids.

The embalming fluids of the present invention containing small amounts of soluble silicofluoride prevent bacterial decomposition. In addition the silicofluoride fluids of the present invention take up free water and substantially retard tissue dehydration for relatively long periods of time. Investigations have shown the fluids containing silicofluorides to be unique in the embalming art and to be a distinct improvement over the fluids heretofore available.

It will be understood by those skilled in the art that the present invention is not limited to the specific example disclosed herein. All changes and modifications falling within the scope of the present invention are intended to be covered by the appended claims.

I claim:

1. An embalming composition containing soluble salts of hydrofluosilicic acid.

2. An embalming fluid containing as an essential ingredient a water soluble metallic silicofluoride salt.

3. An embalming solution containing magnesium silicofluoride.

4. An aqueous embalming fluid consisting essentially of formaldehyde and a soluble silicofluoride.

5. An embalming fluid containing magnesium silicofluoride and a sulphonated higher alcohol.

6. An embalming composition containing magnesium silicofluoride, formaldehyde, methanol, glycerine, magnesium sulphate and a chemical agent for lowering the surface tension and for increasing the penetration of said composition.

HILTON IRA JONES.